(12) United States Patent
Bhaskar et al.

(10) Patent No.: US 7,471,341 B2
(45) Date of Patent: Dec. 30, 2008

(54) APPARATUS, METHODS, AND ARTICLES FOR A BLIND GHOST CANCELLATION ON AN SD VIDEO

(75) Inventors: Rajesh Bhaskar, Kerala (IN); Sudheesh A Somanathan, Bangalore (IN)

(73) Assignee: Analog Devices, Inc., Norwood, MA (US)

( * ) Notice: Subject to any disclaimer, the term of this patent is extended or adjusted under 35 U.S.C. 154(b) by 133 days.

(21) Appl. No.: 10/781,420

(22) Filed: Feb. 18, 2004

(65) Prior Publication Data

US 2005/0179819 A1    Aug. 18, 2005

(51) Int. Cl.
*H04N 5/217* (2006.01)

(52) U.S. Cl. .................................................. 348/614

(58) Field of Classification Search ............... 348/614, 348/607
See application file for complete search history.

(56) References Cited

U.S. PATENT DOCUMENTS

| 4,357,631 A | * | 11/1982 | Utsunomiya et al. ......... 348/614 |
| 4,389,623 A | * | 6/1983 | Onishi et al. ................... 333/16 |
| 5,144,414 A | * | 9/1992 | Nishi et al. .................... 348/614 |

* cited by examiner

*Primary Examiner*—M. Lee
(74) *Attorney, Agent, or Firm*—Kenyon & Kenyon LLP

(57) ABSTRACT

A ghost image cancellation technique for video signals received from multipaths during transmission of a TV signal over a transmission channel. In one example embodiment, an apparatus computes edge parameters of synchronization signals received from each of the multipath video signals. The edge parameters are then used to select an input video signal. The selected input video signal along with the computed edge parameters are then used to remove remaining video signals from the video signals received from the multipaths to cancel ghost images.

35 Claims, 5 Drawing Sheets

APPARATUS, METHODS, AND ARTICLES FOR A BLIND GHOST CANCELLATION ON AN SD VIDEO

FIELD OF THE INVENTION

The present invention relates to processing television signals, and, in particular, to ghost cancellation in standard definition (SD) video signals.

BACKGROUND OF THE INVENTION

In a television (TV) receiver, a TV signal transmitted from a broadcasting station is converted into electric signals at a receiving antenna and is then converted into base band video signals by a tuner. A TV signal reaches an antenna via a plurality of paths by some shielding or reflecting in addition to its direct arrival.

The TV signal can get repeatedly reflected, due to possible geographic obstacles, such as buildings, and the like, and the reflected television signals can suffer a delay in time and a change in strength when compared with the a directly reached television signal. When reproducing the received television signals on a TV screen, these reflected TV signals may often produce ghost images.

There are a number of conventional ghost cancellation techniques based on using an internationally accepted Ghost Cancellation Reference (GCR) signal. Most of these techniques either use some form of an adaptive filter or an FFT (Fast Fourier Transform) based technique to identify the channel characteristics using the GCR and subsequently reduce the effect of a ghost image on a video signal. However, these techniques are computationally intensive and are complex to implement on a real-time basis. In addition, the use of the GCR signal is still not very popular and hence is not very widely used.

SUMMARY OF THE INVENTION

A ghost cancellation technique for multipath video signals received during transmission of a TV signal over a transmission channel. In one example embodiment, this is accomplished by computing edge parameters of synchronization signals received from each of the multipath video signals. A ghost associated with each of the multipath video signals is then detected using the computed edge parameters. An input video signal is then selected from the detected ghost images and the remaining ghost images are then canceled using the selected input video signal and the computed edge parameters.

DETAILED DESCRIPTION OF THE INVENTION

The present invention provides a computationally efficient technique that can be implemented on real-time basis to cancel ghost images in video signals received from multipaths that arise during transmission of a video signal through a transmission channel. In addition, the present invention does not use GCR signals to detect and cancel ghost images, and therefore the technique is versatile and can be implemented to cancel ghost images even in systems that does not use GCR signals. In one example embodiment, the ghost images are cancelled using the detected edge parameters of synchronization signals in the received multipath video signals.

In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore not to be taken in a limiting sense, and the scope of the present invention is defined only by the appended claims.

The terms "ghost image detection circuit" and the "edge detection circuit" are used interchangeably throughout the document.

Figure 1:
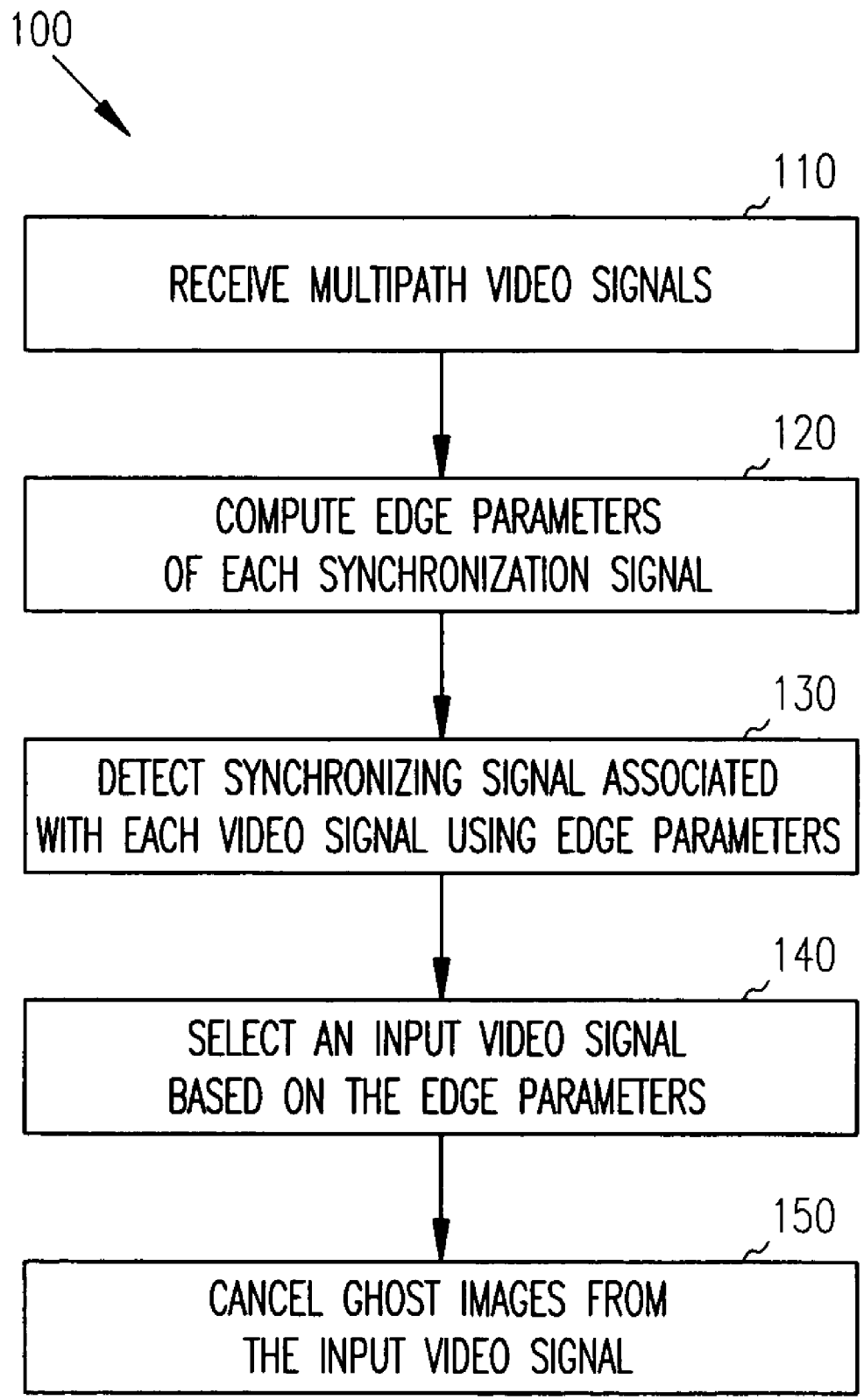
FIG. 1 is a flowchart illustrating a ghost cancellation technique.

FIG. 1 is a flowchart illustrating an example embodiment of a method 100 of a ghost cancellation technique according to the present subject matter. At 110, the method 100 in this example embodiment receives multipath video signals via a transmission channel. The video signals are received on a field-by-field basis.

Figure 2:
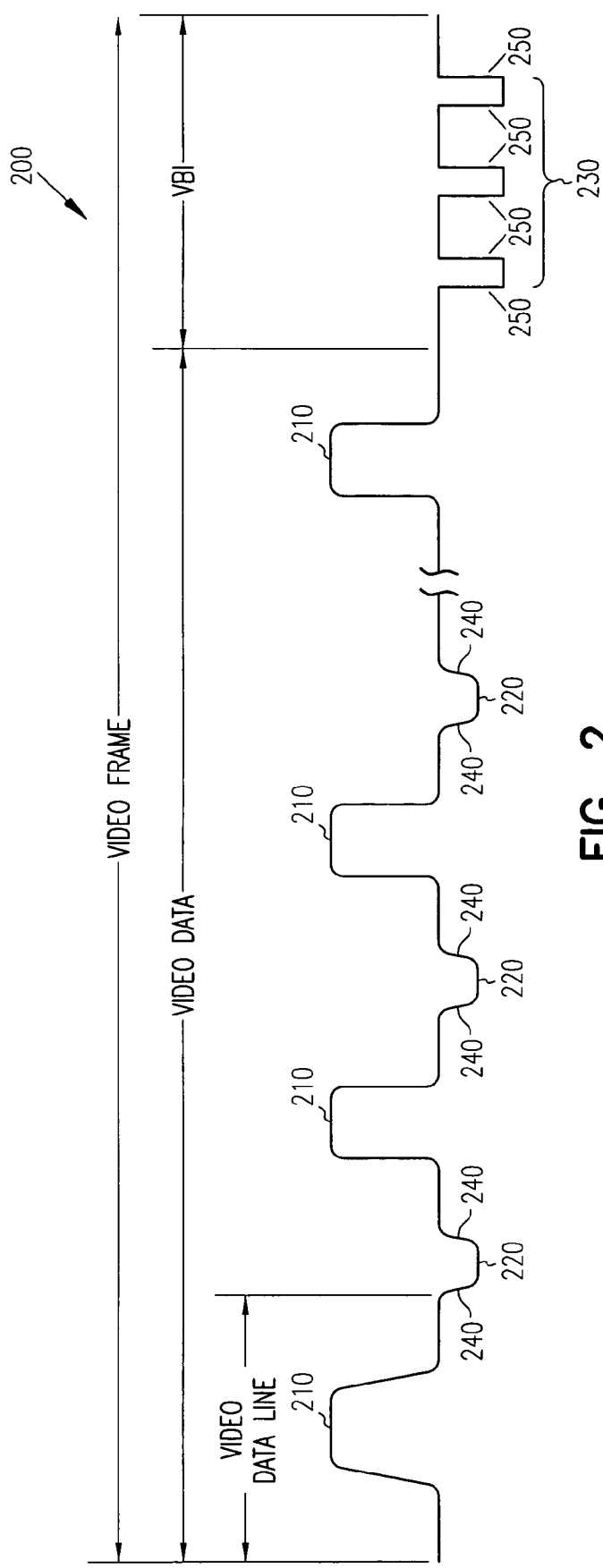
FIG. 2 illustrates a timing diagram of a typical video field transmitted via a transmission channel.

Referring now to FIG. 2, there is illustrated a timing diagram 200 showing an example video data in each video field of a video signal transmitted via the transmission channel. As shown in FIG. 2, each video field includes plurality of video lines (such as the video line 210 shown in FIG. 2), a horizontal synchronization (Hsync) signal 220 at the end of each video line 210, and a vertical synchronization (Vsync) signal including serration pulses 230 in the vertical blanking interval (VBI) portion of the video field at the end of the plurality of video lines and before the start of a new video field. Generally, each video line lasts for about 64 microseconds. There are typically about 262 (312) video lines including video data in each video field in an NTSC (PAL) video standard. The time duration of a Hsync signal is about 4.7 microseconds. The time duration of a Vsync signal is about 192 microseconds (about 3 video lines). Also shown in FIG. 2 are the edges 240 of Hsync signals 220 and edges 250 of the Vsync signals 230 that are used in detecting and canceling the ghost images.

Figure 3:
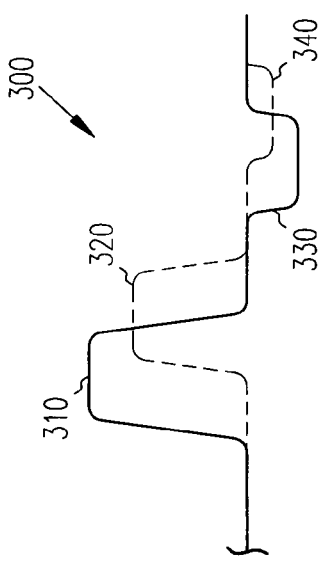
FIG. 3 illustrates a timing diagram of receiving multiple video signals due to multipath propagation/interference.

Referring now to FIG. 3, the timing diagram 300 illustrates a typical scenario of multipath propagation/interference caused by two video signals, one being a directly received video signal and the other being a reflected signal, 310 and 320, respectively, received via a transmission channel. As shown in FIG. 3 the reflected video signal 320 received via the transmission channel has lower amplitude than the directly received video signal 310. As shown in FIG. 3, the reflected signal 320 can have a time delay 't' with respect to the directly received video signal 310. It can be envisioned that any number of such multipath video signals can be received via the transmission channel due to a multipath interference. Further, FIG. 3 shows receiving synchronization signals 330 and 340 associated with the directly received and reflected video signals, 310 and 320, respectively.

At 120, edge parameters of each synchronizing signal are computed. The computed edge parameters can include a slope, amplitude, a time of occurrence, and so on. The computation of the edge parameters, such as slope of an edge of a synchronizing signal helps characterize whether an edge is a rising edge or a falling edge. At 130, the synchronization signal associated with each video signal (received from both direct and reflected signals) is detected using the computed edge parameters.

Figure 4:
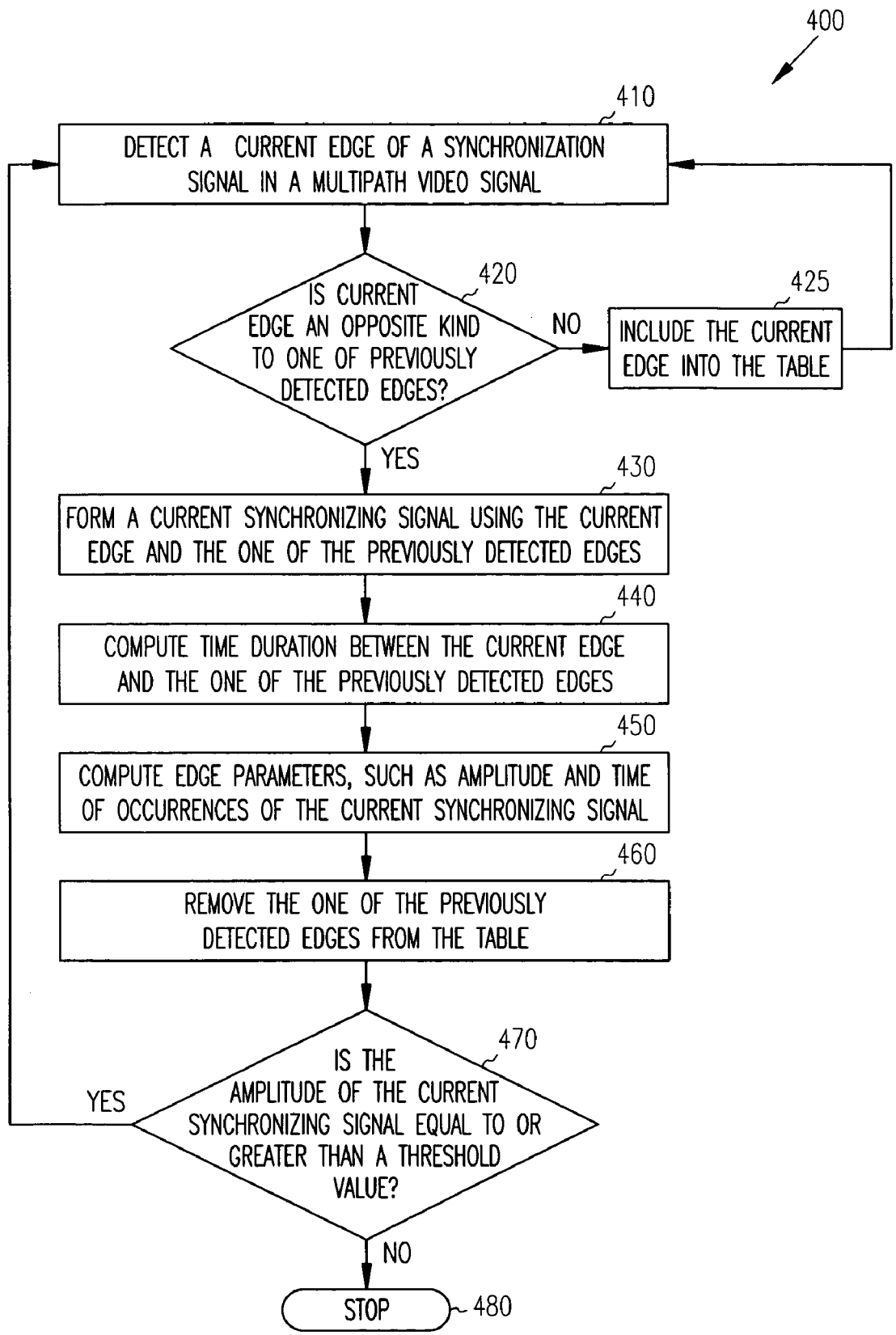
FIG. 4 is a flowchart illustrating an edge detection of a synchronization signal in a received multipath video signal.

FIG. 4 is a flowchart illustrating an example embodiment of a method 400 of computing edge parameters and detecting associated synchronization signals according to the present subject matter. At 410, the method 400 in this example embodiment detects a current edge of a synchronization signal in the multipath video signals. In some embodiments, the detected current edge can be of a Hsync signal in a current video line and/or a Vsync signal in a current video field.

At 420, the detected current edge is compared with the previously detected edges stored in a table to see if the current edge is of an opposite kind and substantially equal in amplitude to one of the already detected edges in the table. For example, if the current edge is a rising edge then the previously detected and stored edges are checked to see if there is any falling edge having substantially equal amplitude in the table and vice versa. If the current edge is not of an opposite kind to one of the previously stored edges in the table, then the current edge is included, i.e., stored, in the table at 425 and then the method 400 goes back to detecting a next edge of a synchronizing signal in the multipath video signal at 410. If the current edge is of an opposite kind to the one of the previously detected and stored edges, then the previously detected and stored edge is selected and a current synchronizing signal is formed using the detected current edge and the selected previously detected edge at 430.

At 440, time duration between the current edge and the selected previously detected edge is computed. In some embodiments, if an edge-to-edge duration is equal to Hsync width, i.e., equal to about 4.7 microseconds, then such edge pair is classified as a synchronizing signal. At 450, edge parameters, such as amplitude and a time of occurrence of the formed current synchronizing signal is computed. At 460, the selected previously detected edge is removed from the table.

At 470, the amplitude of the current synchronizing signal is compared to a threshold value. If the amplitude of the current synchronizing signal is equal to or greater than the threshold value, the method 400 goes to act 410 to detect a next edge and a next synchronizing signal at 470. If the amplitude of the current synchronizing signal is less than the threshold value, the method 400 stops at 480.

At 140, an input video signal is selected based on the detected synchronizing signals and the computed edge parameters. In some embodiments, the amplitudes of formed synchronizing signals are checked. A synchronizing signal having highest amplitude is chosen based on the outcome of checking. The video signal associated with the chosen synchronizing signal is selected as the input video signal.

At 150, ghost images from the input video signal are canceled. In some embodiments, the amplitudes of the formed synchronizing signals are normalized to the amplitude of the synchronizing signal of the input video signal. The input video signal is then delayed by the time of occurrence of a substantially subsequent synchronizing signal. Remaining video signals are then canceled by multiplying the delayed input video signal with the normalized amplitude of the subsequent synchronizing signal to cancel the ghost images from the input video signal.

In some embodiments, ghost images in the input video signal are canceled on a line-by line basis. In these embodiments, edge parameters, such as the slope, the amplitude, and the time of occurrence of the current edge in the current video line are computed. The slope of the current edge is then compared to slopes of the previously detected edges in the current video line stored in a table. A current Hsync signal is then formed by using the current edge along with the one of the previously detected edges, when the slope of the current edge is opposite the slope of the one of the previously detected edges stored in the table and a time duration between the current edge and the one of the previously detected edges is substantially equal to the Hsync width. Further, the amplitude of the current edge is computed. Furthermore, the one of the previously detected edges is removed from the table.

Also in these embodiments, the amplitude of the current horizontal signal is compared to a threshold value. The above-described acts are then repeated to form a next Hsync signal when the amplitude of the current Hsync signal is greater than or equal to the threshold value.

Further in these embodiments, amplitudes of the formed Hsync signals are checked. A formed Hsync signal having highest amplitude is then chosen based on the checking. The video signal associated with the chosen Hsync signal is then selected as the input video signal. The amplitudes of the formed Hsync signals are then normalized to the amplitude of the Hsync signal associated with the chosen input video signal. The input video signal is then delayed by a time of occurrence of a subsequent Hsync signal. The remaining video signals are then canceled by multiplying the delayed input video signal with the normalized amplitudes of remaining Hsync signals and subtracting them from the ghosted input video signal.

Figure 5:
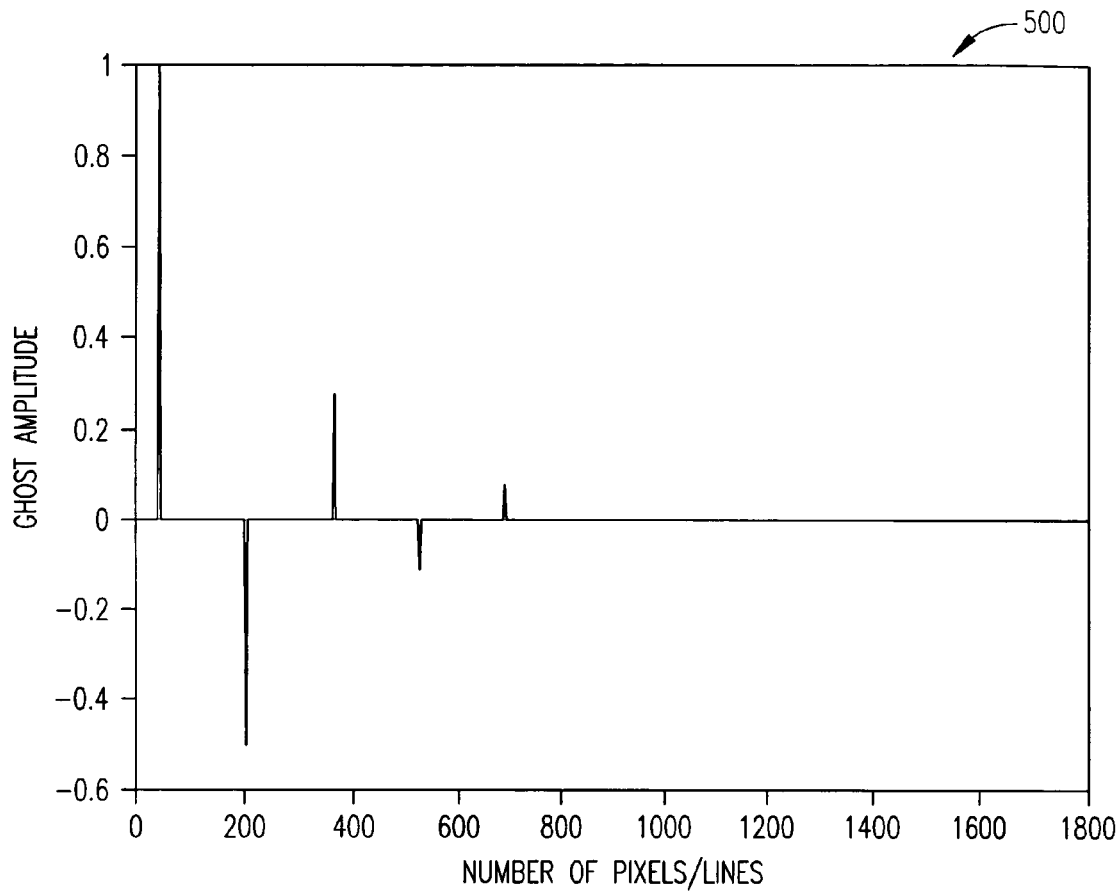
FIG. 5 illustrates ghost image amplitudes detected over lines/fields.
Figure 6:
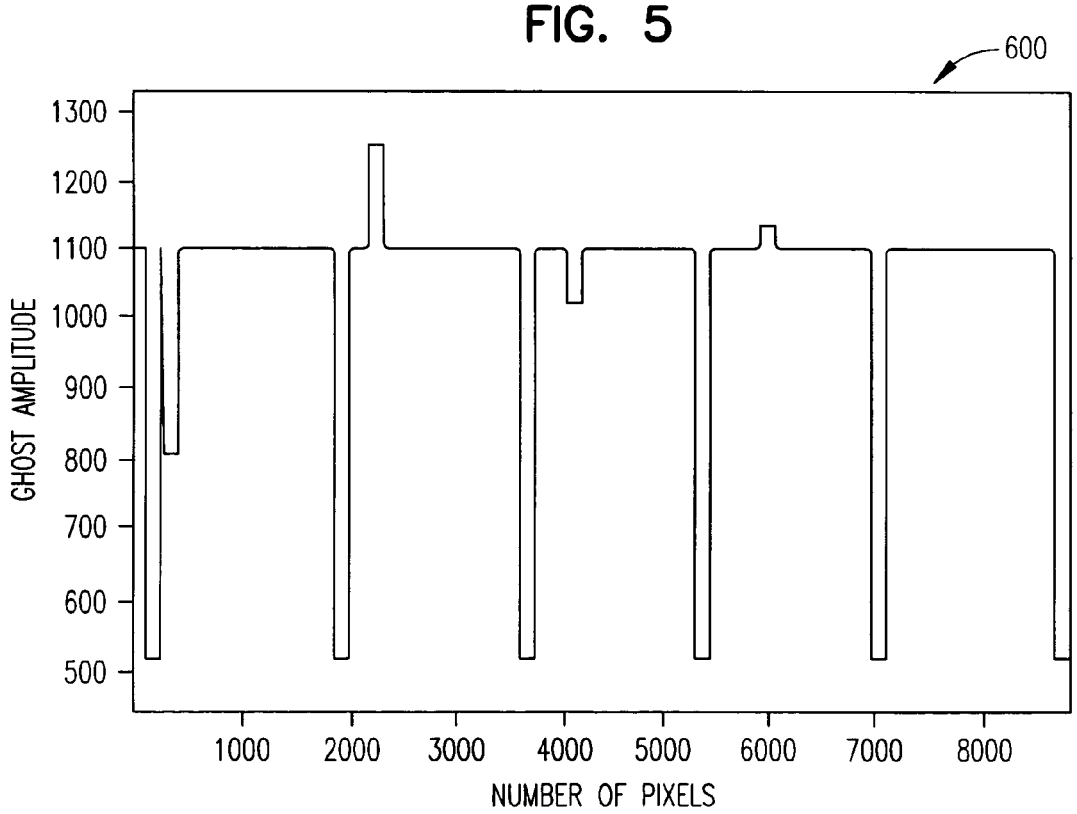
FIG. 6 is a timing diagram illustrating a ghost image suppression achieved when using a horizontal synchronization (Hsync) signal to detect and cancel the ghost images in a multipath video signal.

Referring now to FIG. 5, 500 illustrates ghost amplitudes that have been detected based on a line-by-line approach described above. The y-axis shows the amplitude of the ghost signal and the x-axis shows the delayed locations of the ghost signals in terms of pixels. It can be seen that the amplitude of the ghost images are reduced gradually over a few hundred video lines. FIG. 6 illustrates an example of a ghost image cancellation achieved using the line-by-line approach described above.

In some embodiments, ghost images are canceled on a field-by-field basis using edge parameters of start of a Vsync signal in each video field. In general, the serration pulses in the Vsync signal gives a sequence of edges, such as fall, rise, and fall with a defined duration between them. In these embodiments, a current edge of a vertical Vsync signal in the VBI in a current video field is detected. Edge parameters, such as a slope, amplitude, and a time of occurrence of the detected current edge are then computed. The computed slope of the current edge is then compared to slopes of previously detected edges stored in a table to see if there are any two edges having any of the slopes of the previously detected edges are of an opposite kind and any of the slopes of the previously detected edges are of a same kind. If two of the previously detected edges have a slope that is of an opposite kind and same kind to the slope of the detected current edge, then these three edges are selected. A current Vsync signal is then formed using the detected current edge and the selected previously detected edges. Also, time duration between the current edge and the selected previously detected edges is computed. Further, amplitude of the current edge is computed. Furthermore, the selected previously detected edges are removed from the table. If two of the previously detected edges do not have a slope that is of the opposite and same kind to the slope of the detected current edge, then the detected current edge is stored in the table along with the previously detected edges. The above-described process is then repeated to detect a next edge to form a next Vsync signal.

Also in these embodiments, the amplitude of the current vertical signal is compared to a threshold value. The above-described process is then repeated to form a next Vsync signal when the amplitude of the current Vsync signal is greater than or equal to the threshold value.

Further in these embodiments, the amplitudes of the previous and current Vsync signals are checked and a Vsync signal having highest amplitude is chosen based on the outcome of the checking. A video signal associated with the chosen Vsync signal is then selected as the input video signal. The amplitudes of the previous and current Vsync signals are normalized to the amplitude of the Vsync signal associated with input video signal. The input video signal is then delayed by a time of occurrence of the Vsync signal having lower amplitude. Further, the video signal associated with the lower amplitude is then canceled by multiplying the delayed input video signal with the normalized amplitude of the Vsync signal having the lower amplitude and subtracting the lower amplitude signal from the input video signal (ghosted input video signal).

Referring now to FIG. 5, 500 can also be used to illustrate an example of ghost image amplitudes detected using the above-described field-by-field approach. The y-axis shows the amplitude of the ghost signal and the x-axis shows the delayed locations of the ghost signals in terms of lines. It can be seen that the amplitude of the ghost images are gradually reduced over a few fields. It can also be seen that the time required to reduce the ghost image amplitudes using the field-by-field approach can be longer than the time required to reduce the ghost image amplitudes using the line-by-line cancellation technique shown in FIG. 5. The reason being that the field-by-field approach reduces the amplitude of the ghost images on a video field-by-video field basis, where as, the line-by-line approach reduces the amplitude of the ghost images every video line and therefore requires lesser time to reduce the ghost image amplitudes. The advantage of the field-by-field approach is that the Vsync signals appear only once in the VBI portion of each video field, whereas the Hsync signals appear at the end of each video line and there is a good possibility that during an edge detection that a video signal having a similar edge can be detected as the edge of a Hsync signal. Therefore, the field-by-field approach of detecting a Vsync signal in the VBI portion of a video signal offers a more robust detection technique to cancel ghost images. Further, range of ghosts that can be reduced on a line-by-line approach is limited to around 12 microseconds, but with a field-by-field approach a much higher range can be achieved.

Although the flowcharts 100 and 400 include acts that are arranged serially in the exemplary embodiments, other embodiments of the subject matter may execute two or more acts in parallel, using multiple processors or a single processor organized as two or more virtual machines or sub-processors. Moreover, still other embodiments may implement the acts as two or more specific interconnected hardware modules with related control and data signals communicated between and through the modules, or as portions of an application-specific integrated circuit. Thus, the exemplary process flow diagrams are applicable to software, firmware, and/or hardware implementations.

Figure 7:
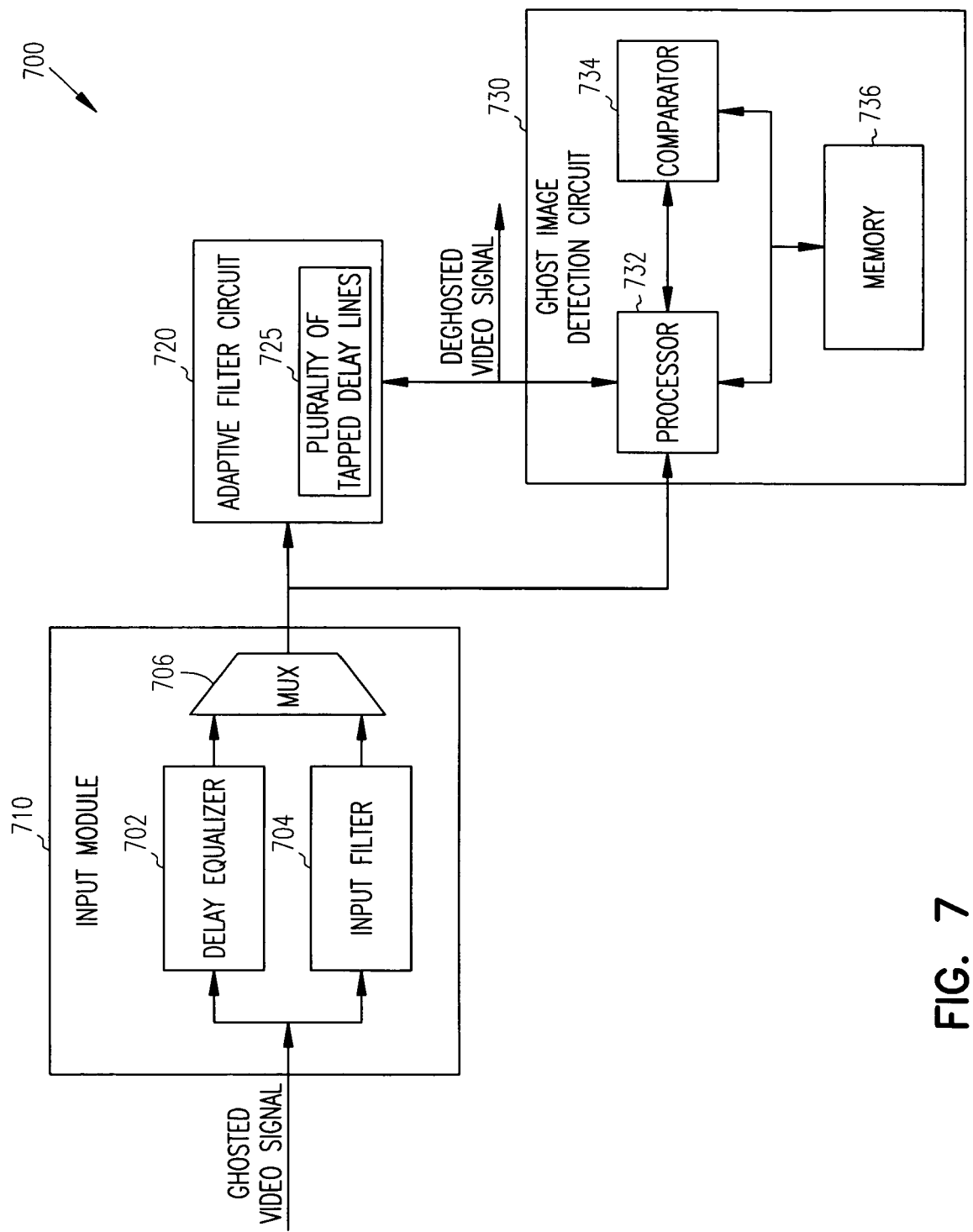
FIG. 7 is a block diagram illustrating an example integrated circuit for implementing embodiments of the present invention.

FIG. 7 is a block diagram illustrating an example integrated circuit 700 including embodiments of the invention. The integrated circuit 700 shown in FIG. 7 illustrates an input module 710, an adaptive filter circuit 720, and a ghost image detection circuit 730 including a plurality of tapped delay lines 725. As shown in FIG. 7, the input module 710 includes a delay equalizer 702, an input filter 704, and a MUX 706. Also as shown in FIG. 7, the ghost image detection circuit 730 includes a processor 732, a comparator 734, and memory 736. The integrated circuit 700 can be incorporated into an application specific integrated circuit (ASIC), a digital signal processor (DSP), and other such devices.

The ghost detection and cancellation algorithm processes synchronization signals, such as Hsync signal and the serration pulses in the Vsync signal. To improve noise immunity, the input filter 704 is switched into the input path during ghost detection. In order to equalize the data path delay, the delay equalizer 702 is added in regions of ghost cancellation. The MUX 706 switches between the delay equalizer 702 and the input filter 704 during ghost cancellation and edge detection phases.

In operation, the input module 710 receives multipath video signals that arise during transmission of a television signal over a transmission channel. Each of the received video signals includes a synchronization signal. The processor 732, during a ghost detection period, receives each video signal from the input module 710 and detects edges associated with the synchronization signals. The processor 732 then computes edge parameters of the detected edges and stores them in memory 736.

The processor 732 detects synchronization signals associated with each received video signal based on the computed edge parameters. In some embodiments, the processor 732 selects a video signal as an input video signal from the multipath video signals based on the detected synchronization signals and the computed edge parameters.

The processor 732 generates tap coefficients based on the detected synchronization signals. In some embodiments, the processor 732 generates tap coefficients using the input video signal, the detected synchronization signals, and the edge parameters. The adaptive filter circuit 720 receives the tap coefficients from the ghost image detection circuit 730 and controls the plurality of tapped delay lines 725 to cancel the ghost images.

In some embodiments, the processor 732 detects a current edge of a synchronization signal in the input video signal. The comparator 734 compares the detected current edge to previously detected edges stored in a table. The processor 732 then forms a current synchronization signal by using the current edge and the one of the previously detected edges in the table when the current edge is of an opposite kind to one of the previously detected edges in the table. The processor 732 then computes amplitude and a time of occurrence of the current synchronization signal using the edge parameters. The processor 732 then removes the used one of the previously detected edges from the table.

In these embodiments, the processor 732 normalizes the amplitudes of detected synchronization signals to the input video signal. The processor 732 then computes a filter tap coefficient by using amplitude of a detected ghost Hsync. The adaptive filter circuit 720 then delays the input video signal and cancels remaining video signals based on the computed filter tap coefficient.

Also in these embodiments, the comparator 734 compares amplitude of the formed current synchronization signal to a threshold value. The processor 732 then cancels a next ghost image if the amplitude of the next detected synchronization signal is greater than or equal to the threshold value.

In some embodiments, the input module 710 receives multipath line-by-line video signals. Each of these received video lines includes a Hsync signal. In these embodiments, the adaptive filter circuit 720 receives each video line from the input module 710. The processor 732 receives each video line from the input module 710 and computes edge parameters in each video line. The processor 732 then detects each Hsync signal based on the edge parameters. The processor 732 then generates tap coefficients based on the detected video edges/syncs. The adaptive filter circuit 720 receives the tap coefficients from the ghost image detection circuit 730 and controls the plurality of tapped delay lines 725 to cancel ghost lines.

In some embodiments, the processor 732 detects a current edge in the Hsync signal of a current video line in the video signal. The processor 732 then computes a slope, amplitude, and a time of occurrence of the current edge.

Also in these embodiments, the comparator 734 compares the slope of the current edge to slopes of previously detected edges in the current video line stored in a table. The processor 732 then forms a current Hsync signal by using the current edge along with the one of the previously detected edges and computes an amplitude of the current edge and removes the one of the previously detected edges from the table if the slope of the current edge is opposite the slope of the one of the previously detected edges stored in the table and a time duration between the current edge and the one of the previously detected edges is substantially equal to an Hsync width. In these embodiments, the processor 732 stores the current edge along with the previously detected edges in the table if the slope of the current edge is not opposite to the slope of the one of the previously detected edges in the table.

In other embodiments, the input module 710 receives field-by-field video signals. Each field includes a VBI. Each VBI includes serration pulses in a Vsync signal. In these embodiments, the processor 732 detects the Vsync signal in a current video field based on edge parameters of the serration pulses in the Vsync signal. The processor 732 then cancels a ghost image in a next video field by using the computed edge parameters and the detected Vsync signal. The process of canceling the ghost image using the detected Vsync signal is explained in more detail with reference to FIGS. 4 and 5.

CONCLUSION

The above-described invention provides an improved solution to cancel ghost images in multipath video signals. In addition, the above-described invention can be used in real-time and in systems where GCR signals are not available. This is achieved by using edge parameters of synchronizations signals in the received multipath video signals.

The various embodiments of the ghost cancellation techniques described herein are applicable generally to any television signal processing, and the embodiments described herein are in no way meant to limit the applicability of the invention. In addition, the techniques of the various example embodiments are useful to the design of any hardware implementations of software, firmware, and algorithms. The above description is intended to be illustrative, and not restrictive. Many other embodiments will be apparent to those skilled in the art. The scope of the invention should therefore be determined by the appended claims, along with the full scope of equivalents to which such claims are entitled.

The invention claimed is:

1. A method for canceling ghost images generated due to multipath propagation/interference in an input video signal, comprising:
   receiving multipath video signals, wherein each video signal includes a synchronization signal;
   computing edge parameters of each synchronization signal;
   detecting the synchronization signal associated with each video signal based on the edge parameters; and
   canceling the ghost images from the input video signal using the synchronization signals and the edge parameters.

2. A method for canceling ghost images generated due to multipath propagation/linterference in an input video signal, comprising:
   receiving multipath video signals, wherein each video signal includes a synchronization signal;
   computing edge parameters of each synchronization signal;
   detecting the synchronization signal associated with each video signal based on the edge parameters; and
   canceling the ghost images from the input video signal using the synchronization signals and the edge parameters,
   wherein canceling the ghost images using the synchronization signals and the edge parameters comprises:
      selecting the input video signal based on the detected synchronization signals and the edge parameters; and
      canceling remaining video signals from the selected input video signal using the edge parameters.

3. The method of claim 2, wherein detecting the synchronization signal associated with each video signal based on the edge parameters comprises:
   detecting a current edge of a synchronization signal in the input video signal;
   comparing the current edge to previously detected edges stored in a table;
   if the current edge is of an opposite kind and having substantially equal amplitude to one of the previously detected edges in the table, then selecting the opposite kind previously detected edge and forming a current synchronization signal by using the current edge and the selected previously detected edge, computing a time duration between the current edge and the selected previously detected edge using the edge parameters, computing an amplitude and time of occurrence of the current synchronization signal, and removing the selected previously detected edge from the table; and
   repeating the detecting, comparing, and computing steps to form a next synchronizing signal.

4. The method of claim 3, further comprising:
   if the current edge is not of an opposite kind to one of the previously detected edges stored in the table, then storing the current edge along with the previously stored edges in the table; and
   repeating the detecting, comparing, and computing steps to form the next synchronizing signal.

5. The method of claim 3, wherein selecting the input video signal based on the synchronization signals and the edge parameters comprises:
   checking the amplitudes of formed synchronizing signals;
   choosing a synchronizing signal having a highest amplitude based on the outcome of the comparison; and
   selecting a video signal associated with the chosen synchronizing signal as the input video signal.

6. The method of claim 3, wherein canceling the remaining video signals from the selected input video signal comprises:
normalizing the amplitudes of the formed synchronizing signals to the amplitude of the synchronizing signal of the input video signal;
delaying the input video signal by the time of occurrence of a substantially subsequent synchronizing signal; and
canceling the remaining video signals by multiplying the delayed input video signal with the normalized amplitude of the subsequent synchronizing signal and subtracting the remaining video signals from the input video signal.

7. The method of claim 3, further comprising:
comparing amplitude of the current synchronizing signal to a threshold value; and
if the amplitude of the current synchronizing signal is greater than or equal to the threshold value then repeating the above steps to form a next video signal.

8. The method of claim 1, wherein the synchronization signal comprises a signal selected from the group consisting of a horizontal synchronization (Hsync) signal and serration pulses in a vertical synchronization (Vsync).

9. A method for canceling ghost images from multipath video signals that arise during transmission of a TV signal via a channel, comprising:
receiving multipath line-by-line video signals, wherein each video line includes a Hsync signal;
computing edge parameters of each video line;
detecting each Hsync signal based on the edge parameters; and
canceling ghost lines from the multipath line-by-line video signals by using the detected Hsync signals and the edge parameters.

10. A method for canceling ghost images from multipath video signals that arise during transmission of a TV signal via a channel, comprising:
receiving multipath line-by-line video signals, wherein each video line includes a Hsync signal;
computing edge parameters of each video line;
detecting each Hsync signal based on the edge parameters; and
canceling ghost lines from the multipath line-by-line video signals by using the detected Hsync signals and the edge parameters,
wherein detecting each Hsync signal based on the edge parameters comprises:
detecting a current edge in the Hsync signal of a current video line in the video signal;
computing a slope, an amplitude, and a time of occurrence of the current edge;
comparing the slope of the current edge to slopes of previously detected edges in the current video line stored in a table; and
if the slope of the current edge is opposite the slope of one of the previously detected edges stored in the table and a time duration between the current edge and the one of the previously detected edges is substantially equal to an Hsync width, then forming a current Hsync signal by using the current edge along with the one of the previously detected edges and computing the amplitude of the current edge, and removing the one of the previously detected edges from the table.

11. The method of claim 10, further comprising:
if the slope of the current edge is not opposite to the slope of the one of the previously detected edges in the table, then storing the current edge along with the previously detected edges in the table; and
repeating the detecting, comparing, and computing steps to form a next Hsync signal.

12. The method of claim 10, wherein canceling the ghost lines from the multipath line-by-line video signals comprises:
checking the amplitudes of formed Hsync signals;
choosing a Hsync signal having a highest amplitude based on the outcome of the checking;
selecting a video signal associated with the chosen Hsync signal as the input video signal;
normalizing the amplitudes of the formed Hsync signals to the amplitude of the Hsync signal associated with the input video signal;
delaying the input video signal by the time of occurrence of a subsequent Hsync signal; and
canceling remaining video signals in a next video line by multiplying the delayed input video signal with the normalized amplitudes of remaining Hsync signals and subtracting the remaining video signals from the next video line.

13. The method of claim 11, further comprising:
comparing the amplitude of the current Hsync signal to a threshold value; and
if the amplitude of the current Hsync signal is greater than or equal to the threshold value then repeating the above steps to form a next Hsync signal.

14. A method for canceling ghost images from a field-by-field video signal transmitted via a transmission channel, comprising:
receiving multipath field-by-field video signals, wherein each video field includes a vertical blanking interval (VBI), and wherein the VBI includes a Vsync signal;
detecting the Vsync signal in a current video field based on edge parameters of the Vsync signal including serration pulses; and
canceling a ghost image in a next video field by using the edge parameters and the detected Vsync signal.

15. The method of claim 14, wherein detecting the Vsync signal in the current video field based on the edge parameters comprises:
detecting a current edge in the Vsync signal in the current video field;
computing a slope, amplitude, and a time of occurrence of the current edge;
comparing the slope of the current edge to slopes of previously detected edges in the current video field stored in a table; and
if the slope of the current edge is opposite the slope of one of the previously detected edges in the table and is if the slope of the current edge is same as another one of the previously detected edges in the table, then forming a current Vsync signal by using the current edge along with the two of the previously detected edges and computing a time duration between the current edge and the two of the previously detected edges and an amplitude of the current edge, and removing the two of the previously detected edges from the table.

16. The method of claim 15, further comprising:
if the slope of the current edge is not opposite the slope of one of the previously detected edges in the table and if the slope of the current edge is same as another one of the previously detected edges in the table, then including the current edge in the table; and
repeating the detecting, comparing, and computing steps to form a next Vsync signal.

17. The method of claim 15, wherein canceling the ghost in the next video field using the edge parameters and the detected Vsync signal comprises:

checking the amplitudes of previous and current Vsync signals;

choosing a Vsync signal having a highest amplitude based on the outcome of the checking;

selecting a video signal associated with the chosen Vsync signal as the input video signal;

normalizing the amplitudes of the previous and current Vsync signals to the amplitude of the Vsync signal associated with the input video signal;

delaying the input video signal by the time of occurrence of a Vsync signal having lower amplitude; and canceling a remaining video signal in the next video field by multiplying the delayed input video signal with the normalized amplitude of the Vsync signal having the lower amplitude and subtracting remaining video signal from the next video field.

18. The method of claim 15, further comprising:

comparing amplitude of the current Vsync signal to a threshold value; and if the amplitude of the current synchronization signal is greater than or equal to the threshold value then repeating the above steps to cancel a next ghost image.

19. An article comprising:

a storage medium having instructions that, when executed by a computing platform, result in execution of a method comprising:

receiving multipath video signals, wherein each video signal includes a synchronization signal;

computing edge parameters of each synchronization signal;

detecting the synchronization signal associated with each video signal based on the edge parameters; and canceling the ghost images from the input video signal using the synchronization signals and the edge parameters.

20. An article comprising:

a storage medium having instructions that, when executed by a computing platform, result in execution of a method comprising:

receiving multipath video signals, wherein each video signal includes a synchronization signal;

computing edge parameters of each synchronization signal;

detecting the synchronization signal associated with each video signal based on the edge parameters; and canceling the ghost images from the input video signal using the synchronization signals and the edge parameters, wherein canceling the ghost images using the synchronization signals and the edge parameters comprises:

selecting the input video signal based on the detected synchronization signals and the edge parameters; and canceling remaining video signals from the selected input video signal using the edge parameters.

21. The article of claim 20, wherein detecting the synchronization signal associated with each video signal based on the edge parameters comprises:

detecting a current edge of a synchronization signal in the input video signal;

comparing the current edge to previously detected edges stored in a table;

if the current edge is of an opposite kind and having substantially equal amplitude to one of the previously detected edges in the table, then selecting the opposite kind previously detected edge and forming a current synchronization signal by using the current edge and the selected previously detected edge, computing a time duration between the current edge and the selected previously detected edge using the edge parameters, computing an amplitude and time of occurrence of the current synchronization signal, and removing the selected previously detected edge from the table; and repeating the detecting, comparing, and computing steps to form a next synchronizing signal.

22. The article of claim 21, further comprising:

if the current edge is not of an opposite kind to one of the previously detected edges stored in the table, then storing the current edge along with the previously stored edges in the table; and repeating the detecting, comparing, and computing steps to form the next synchronizing signal.

23. An apparatus to cancel ghost images, comprising:

an input module that receives multipath video signals that arise during transmission of a television signal over a transmission channel, wherein each received video signal includes a synchronization signal;

an adaptive filter circuit coupled to the input module that receives each video signal from the input module, wherein the adaptive filter includes a plurality of tapped delay lines; and a ghost image detection circuit coupled to the input module and the adaptive filter circuit, comprising:

a processor that receives each video signal from the input module and detects edges of the synchronization signals, wherein the processor computes edge parameters of the detected edges, wherein the processor detects synchronization signals associated with each received video signal based on the computed edge parameters, and wherein the processor generates tap coefficients based on the detected synchronization signals, wherein the adaptive filter circuit receives the tap coefficients from the ghost image detection circuit and controls the plurality of tapped delay lines to cancel the ghost images.

24. The apparatus of claim 23, wherein the processor selects a video signal as an input video signal from the multipath video signals based on the detected synchronization signals and the edge parameters, and wherein the processor generates tap coefficients using the input video signal and the detected synchronization signals and the edge parameters.

25. An apparatus to cancel ghost images, comprising:

an input module that receives multipath video signals that arise during transmission of a television signal over a transmission channel, wherein each received video signal includes a synchronization signal;

an adaptive filter circuit coupled to the input module that receives each video signal from the input module, wherein the adaptive filter includes a plurality of tapped delay lines; and a ghost image detection circuit coupled to the input module and the adaptive filter circuit, comprising:

a processor that receives each video signal from the input module and detects edges of the synchronization signals, wherein the processor computes edge parameters of the detected edges, wherein the processor detects synchronization signals associated with each received video signal based on the computed edge parameters, and wherein the processor generates tap coefficients based on the detected synchronization signals, wherein the adaptive filter circuit receives the tap coefficients from the ghost image detection circuit and controls the plurality of tapped delay lines to cancel the ghost images, wherein the ghost image detection circuit further comprises:

a comparator coupled to the processor, wherein the processor detects a current edge of a synchronization signal in the input video signal, wherein the comparator then compares the current edge to previously detected edges stored in a table, wherein the processor forms a current synchronization signal by using the current edge and the one of the previously detected edges in the table if the current edge is of an opposite kind to one of the previously detected edges in the table, wherein the processor computes an amplitude and a time of occurrence of the current synchronization signal using the edge parameters, and wherein the processor removes the one of the previously detected edges from the table.

26. The apparatus of claim 25, wherein the ghost image detection circuit further comprises a memory that stores the table and edge parameters of synchronization signals.

27. The apparatus of claim 25, wherein the processor normalizes the amplitudes of detected synchronization signals to the input video signal, wherein the processor computes a filter tap coefficient by using amplitude of a detected ghost Hsync, wherein the adaptive filter circuit delays the input video signal and cancels remaining video signals based on the computed filter tap coefficient.

28. The apparatus of claim 27, wherein the comparator compares amplitude of the formed current synchronization signal to a threshold value, and wherein the processor cancels a next ghost image if the amplitude of the next detected synchronization signal is greater than or equal to the threshold value.

29. The apparatus of claim 23, wherein-the input module further comprises:

an input filter to improve noise immunity of the ghost image detection circuit;

a delay equalizer coupled to the input filter to match delay of the input filter during a ghost cancellation phase; and a MUX coupled to the delay equalizer and the input filter switches between the delay equalizer and the input filter during the ghost cancellation and edge detection phases.

30. An integrated circuit comprising:

an input module that receives multipath line-by-line video signals during transmission of a television signal over a transmission channel, wherein each received video line includes a Hsync signal;

an adaptive filter circuit coupled to the input module that receives each video line from the input module, wherein the adaptive filter includes a plurality of tapped delay lines; and an edge detection circuit coupled to the input module and the adaptive filter circuit, comprising:

a processor that receives each video line from the input module and computes edge parameters in each video line, wherein the processor detects each Hsync signal based on the edge parameters, wherein the processor generates tap coefficients based on the detected video lines, wherein the adaptive filter circuit receives the tap coefficients from the edge detection circuit and controls the plurality of tapped delay lines to cancel ghost lines.

31. The integrated circuit of claim 30, wherein the processor detects a current edge in the Hsync signal of a current video line in the video signal and wherein the processor computes a slope, amplitude, and a time of occurrence of the current edge.

32. An integrated circuit comprising:

an input module that receives multipath line-by-line video signals during transmission of a television signal over a transmission channel, wherein each received video line includes a Hsync signal;

an adaptive filter circuit coupled to the input module that receives each video line from the input module, wherein the adaptive filter includes a plurality of tapped delay lines; and an edge detection circuit coupled to the input module and the adaptive filter circuit, comprising:

a processor that receives each video line from the input module and computes edge parameters in each video line, wherein the processor detects each Hsync signal based on the edge parameters, wherein the processor generates tap coefficients based on the detected video lines, wherein the adaptive filter circuit receives the tap coefficients from the edge detection circuit and controls the plurality of tapped delay lines to cancel ghost lines, wherein the edge detection circuit further comprises:

a comparator that compares the slope of the current edge to slopes of previously detected edges in the current video line stored in a table, wherein the processor forms a current Hsync signal by using the current edge along with the one of the previously detected edges and computes an amplitude of the current edge, and removes the one of the previously detected edges from the table, if the slope of the current edge is opposite the slope of the one of the previously detected edges stored in the table and a time duration between the current edge and the one of the previously detected edges is substantially equal to an Hsync width.

33. The integrated circuit of claim 32, wherein the processor stores the current edge along with the previously detected edges in the table, if the slope of the current edge is not opposite to the slope of the one of the previously detected edges in the table.

34. An apparatus comprising:

a means that receives multipath video signals, wherein each received television signal includes a synchronization signal;

a means that receives the input video signal and computes edge parameters of each synchronization signal and detects the synchronization signals based on the computed edge parameters;

a means to generate tap coefficients based on the detected synchronization signals; and a means to cancel ghost images using the generated tap coefficients.

35. The apparatus of claim 34, further comprising:

a means that stores the detected edges and the edge parameters in a table.

* * * * *